(12) United States Patent
Miller

(10) Patent No.: US 9,744,717 B2
(45) Date of Patent: Aug. 29, 2017

(54) HOLSTER WITH HEAT SHRINKABLE SLEEVE AND METHOD OF MAKING SAME

(71) Applicant: Michael Miller, Carsonville, MI (US)

(72) Inventor: Michael Miller, Carsonville, MI (US)

( * ) Notice: Subject to any disclaimer, the term of this patent is extended or adjusted under 35 U.S.C. 154(b) by 155 days.

(21) Appl. No.: 14/792,731

(22) Filed: Jul. 7, 2015

(65) Prior Publication Data

US 2017/0010066 A1    Jan. 12, 2017

(51) Int. Cl.
| | |
|---|---|
| *B29C 61/02* | (2006.01) |
| *F42B 39/02* | (2006.01) |
| *F41C 33/02* | (2006.01) |
| *B29K 23/00* | (2006.01) |
| *B29K 105/00* | (2006.01) |
| *B29L 31/00* | (2006.01) |

(52) U.S. Cl.
CPC .......... *B29C 61/02* (2013.01); *F41C 33/0236* (2013.01); *F42B 39/02* (2013.01); *B29K 2023/00* (2013.01); *B29K 2105/256* (2013.01); *B29L 2031/777* (2013.01)

(58) Field of Classification Search
CPC .. F41C 33/02; F41C 33/0245; F41C 33/0209; F41C 33/0236; A45F 2200/0591; Y10S 224/911; Y10S 224/912; B29C 51/008; B29C 51/12; B29C 61/02
USPC ................ 224/192–193, 198, 243, 911–912; 224/149–150; 156/84, 85, 212–213; 264/242
See application file for complete search history.

(56) References Cited

U.S. PATENT DOCUMENTS

| | | | | |
|---|---|---|---|---|
| 3,744,687 | A * | 7/1973 | Oreck | F41C 33/06 220/8 |
| 5,922,158 | A * | 7/1999 | Culp | B29C 63/423 156/86 |
| 6,089,432 | A | 7/2000 | Gage et al. | |
| 6,427,374 | B1 | 8/2002 | Vaiani | |
| 6,626,339 | B2 * | 9/2003 | Gates | B62J 9/003 150/154 |
| 8,389,842 | B2 * | 3/2013 | Alleyne | B25G 1/102 84/422.4 |
| 8,936,150 | B1 * | 1/2015 | Whaley | A45C 3/06 150/112 |
| 2004/0118503 | A1 * | 6/2004 | Record | F41H 3/00 156/85 |
| 2004/0251288 | A1 * | 12/2004 | Hancock | B60R 7/14 224/401 |
| 2011/0011517 | A1 * | 1/2011 | Wood | A61F 13/041 156/85 |
| 2012/0090765 | A1 * | 4/2012 | Tailor | B29C 61/00 156/86 |
| 2013/0193172 | A1 * | 8/2013 | Damkot | F41C 33/0209 224/191 |
| 2015/0267994 | A1 * | 9/2015 | Tedder | A45F 5/00 224/242 |

* cited by examiner

*Primary Examiner* — Justin Larson
*Assistant Examiner* — Phillip Schmidt
(74) *Attorney, Agent, or Firm* — Young Basile Hanlon & MacFarlane, P.C.

(57) ABSTRACT

A custom-fitted handgun holster is made using a sleeve of heat-shrinkable polymeric material which has been size-reduced by heating into conformity with at least a portion of a particular handgun. The sleeve may be attached to a holder and decoratively covered if desired.

8 Claims, 3 Drawing Sheets

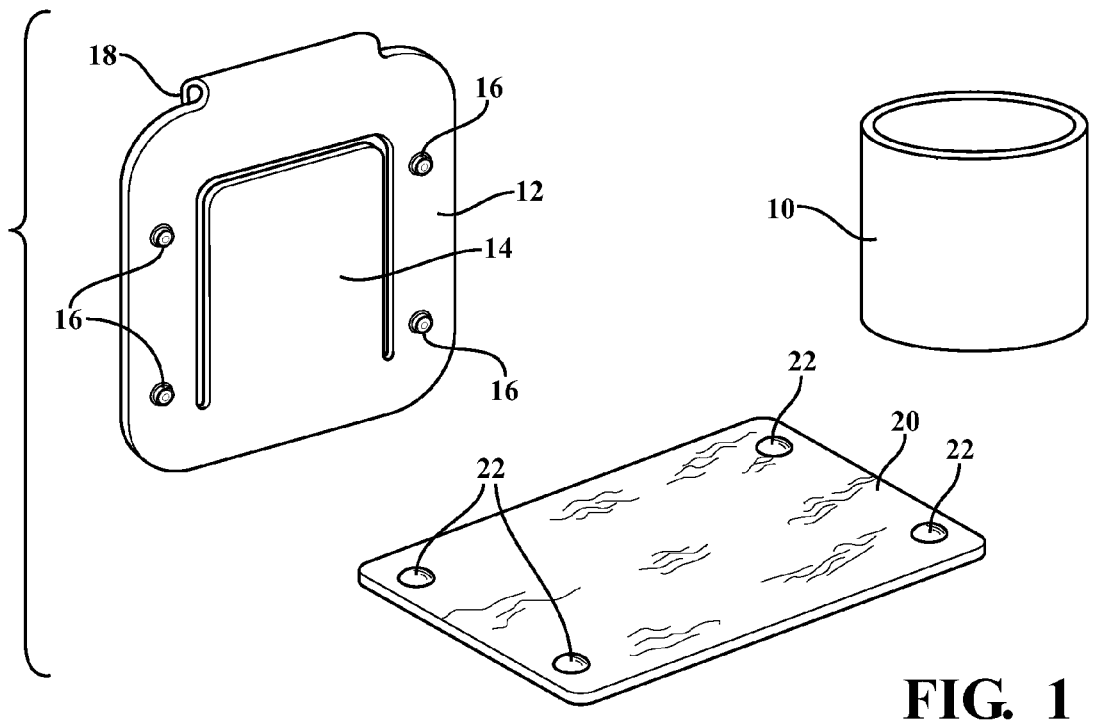
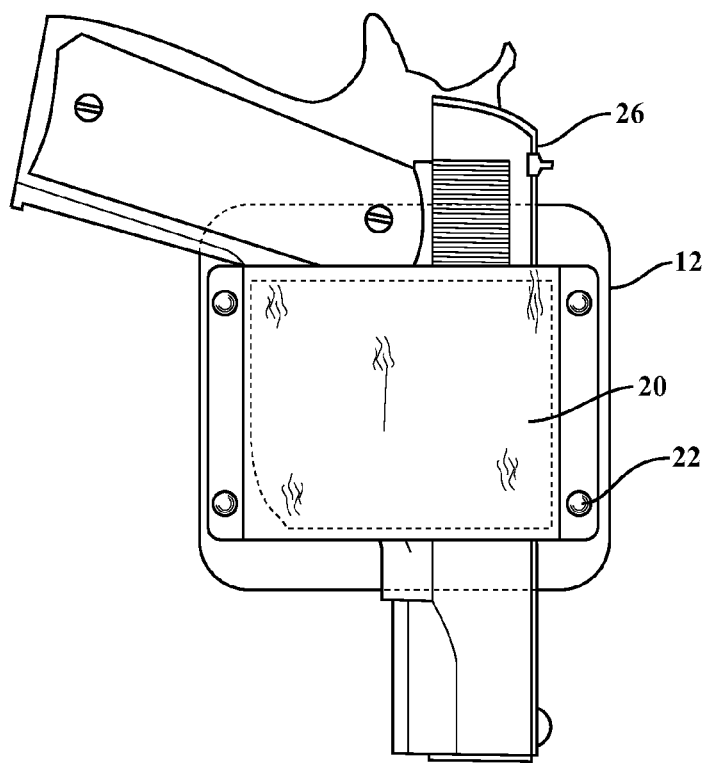

HOLSTER WITH HEAT SHRINKABLE SLEEVE AND METHOD OF MAKING SAME

TECHNICAL FIELD

The present disclosure relates to holstering of firearms and related articles including handguns and ammunition magazines, and particularly to a holster having a sleeve of heat shrinkable polymeric material which has been shrunken by heating into conformity with at least a portion of the article.

BACKGROUND OF THE DISCLOSURE

It is well known that handgun holsters are generally carried in open or concealed fashion through the use of holsters. The term "holster" as used herein is intended to cover a wide variety of close-fitting carriers for handguns and related articles, including holsters worn inside the waistband (IWB), outside the waistband (OWB), ankle holsters, shoulder rigs, both vertical and horizontal, and others of known configuration and variety designed for open or concealed carry or both.

Holsters which closely conform to at least the barrel, slide and trigger guard of a handgun are generally regarded as providing a satisfactory level of security, protection, and convenience. These holsters are often made of leather which has been pre-formed for a specific handgun to provide a tight fit and a high degree of retention. In addition, rigid plastic holsters, sometimes with tension adjustment screws, are also known to provide a secure fit and a high level of retention.

SUMMARY OF THE DISCLOSURE

A first aspect of the invention is a method for making a holster for a handgun or a handgun magazine. This method, generally described, includes the steps of placing a handgun into an open sleeve of heat shrinkable polymeric material such as polyolefin that is larger than the tactical article so as to allow for a marginal space around the article; i.e. a space or gap between the inner surface of the sleeve and the outer surface of the inserted portion of the tactical article. In the case of a handgun, the inserted portion is usually the slide, forward frame portion including dustcover (if any), and at least a portion of the trigger guard. In the case of a magazine, it can be substantially the entire inverted upper length of the magazine minus the floor plate and/or finger extension. The remaining steps then include heating the sleeve, usually with a conventional heat gun with the article placed therein, preferably protected with a cover of a light fabric material, until the sleeve shrinks into substantial conformity with the inserted article or article portion.

This step is best carried out with the heat shrinkable sleeve mounted on a carrier so that the back surface of the re-sized sleeve conforms to the carrier which, as hereinafter described to with reference to a specific and preferred embodiment, can be configured to be worn as an IWB or OWB, or belt loop type holster by the user. An optional final step is to attach a decorative cover over the outside or exposed surface of the sleeve, such as by means of snaps which allow the decorative cover to be removed in the event the user wishes to replace the heat conformed sleeve with a different sleeve for a different gun, or to remold the sleeve to a different gun, both possibilities existing in the case of this invention.

Another aspect to the invention is a finished holster generally made in accordance with the above described steps.

Still a third aspect of the invention is the provision of the do-it-yourself kit including the carrier, the heat shrinkable sleeve in sufficient length to accommodate a particular gun, and the cover with means for attachment to the carrier over the heat shrinkable sleeve. This kit will typically be provided with directions to enable the user to carry out the necessary steps of the method with his/her own handgun or magazine.

The various aspects of the invention will be best understood by reference to the following specification which is to be taken with accompanying drawings, a brief description of which is hereinafter given.

BRIEF DESCRIPTION OF THE DRAWINGS

The description herein makes reference to the accompanying drawings wherein like reference numerals refer to like parts throughout the several views, and wherein:

FIG. 1 is an exploded view of the components used in the manufacture of a holster for a handgun;

FIG. 2 is a view of the finished holster and also showing a semi-automatic type handgun inserted into the holster;

DETAILED DESCRIPTION OF AN ILLUSTRATIVE EMBODIMENT

Figure 3:
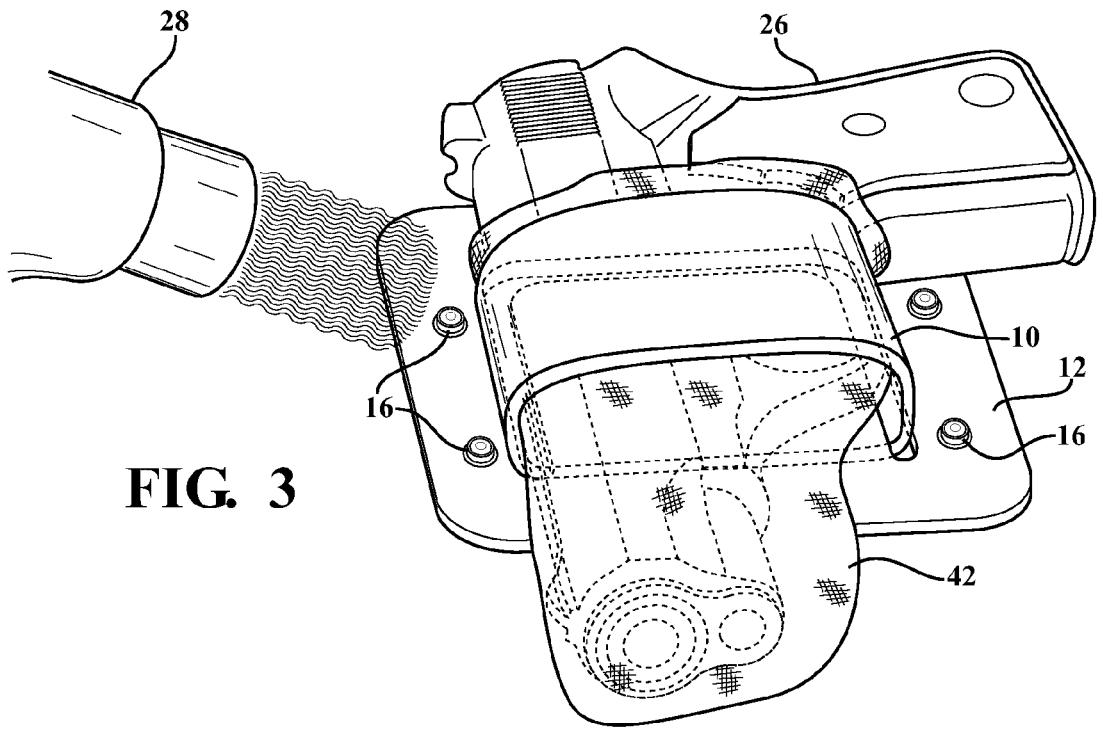
FIG. 3 is a perspective view of a handgun holster at an early stage in the process of manufacture using a heat gun 28 to carry out one of the steps in the manufacturing process.

Referring to FIG. 1, the components which will be used to fabricate a handgun holster in accordance with the method aspect of the present invention are shown to include an open-ended cylindrical sleeve 10 of a heat shrinkable polyolefin material. A sleeve measuring three inches in length by three inches in diameter has been found to accommodate most handguns. The shrink factor of the sleeve is about 3:1, meaning the sleeve can shrink to about one-third of its original diameter. However, as a practical matter, the degree of shrinkage in this case is controlled by the size and contours of the handgun (or other article) placed in the sleeve before it is heated. For a larger handgun, the three inch diameter sleeve may be a close fit, while for medium or small frame guns, the fit may be looser. However, the large shrink factor of the sleeve material is more than enough to bring the sleeve into conformity with small frame guns as well as magazines.

The componentry shown in FIG. 1 further includes a carrier 12 of a more rigid material such as Kydex. In this case, the carrier 12 is generally square in configuration, has a flat front side and is die cut to produce a square tab 14 integral therewith. A flat configuration is shown only as an example; if a curved carrier that conforms to a hip contour is desired, the carrier 12 will be curved accordingly. In addition, the carrier 12 is provided with four snaps 16 arranged around the outside of the tab 14 for purposes to be described. Finally, the carrier 12 comprises a rearwardly spaced belt loop or hook 18 which can, in this illustrative embodiment, be used to attach the finished holster to a user's belt by hooking it over the belt. In this case, the carrier can be used as an IWB or OWB holster. The dimensions of the tab 14 are generally matched to the sleeve 10; i.e., when the sleeve is heat-reduced into conformity with the pistol 26, it will fit snuggly around the tab as hereinafter described.

The componentry shown in FIG. 1 further comprises a decorative leather cover 20 having snaps 22 which are snapped onto the receiver 16 affixed to the back plate 12 around the outside of the tab 14 for purposes to be described. The cover 20 is optional.

The method for fabricating a handgun holster using the componentry shown in FIG. 1, will now be described with reference to FIGS. 3, 4, and 5.

First, the polyolefin sleeve 10 must be chosen to accommodate the dimensions of the handgun 26 or the handgun portion which is to be carried. As stated above, a three inch by three inch sleeve has been found to accommodate a wide range of gun sizes. FIG. 2 shows the inserted portion of the handgun 26 as the middle of the slide and frame portion together with most or all of the trigger guard. In this instance, the holster sleeve is dimensioned so that the forward portion of the slide and frame extends fully through the sleeve thereby to be exposed below the holster. However, it is to be understood that the sleeve 10 can be larger to cover more of the slide and frame portion of the handgun if desired.

In this case, the polyolefin sleeve is known to have a heat shrinking ratio about 3:1. The result of this is that there can be a marginal gap between the sleeve 10 and the inserted portion of the handgun prior to heat shrinking. It is therefore clear that the person fabricating the holster; i.e., following the method steps to make a gun conforming holster, must have the handgun present or at least a proxy for the handgun present when carrying out the method steps as hereinafter described.

Figure 4:
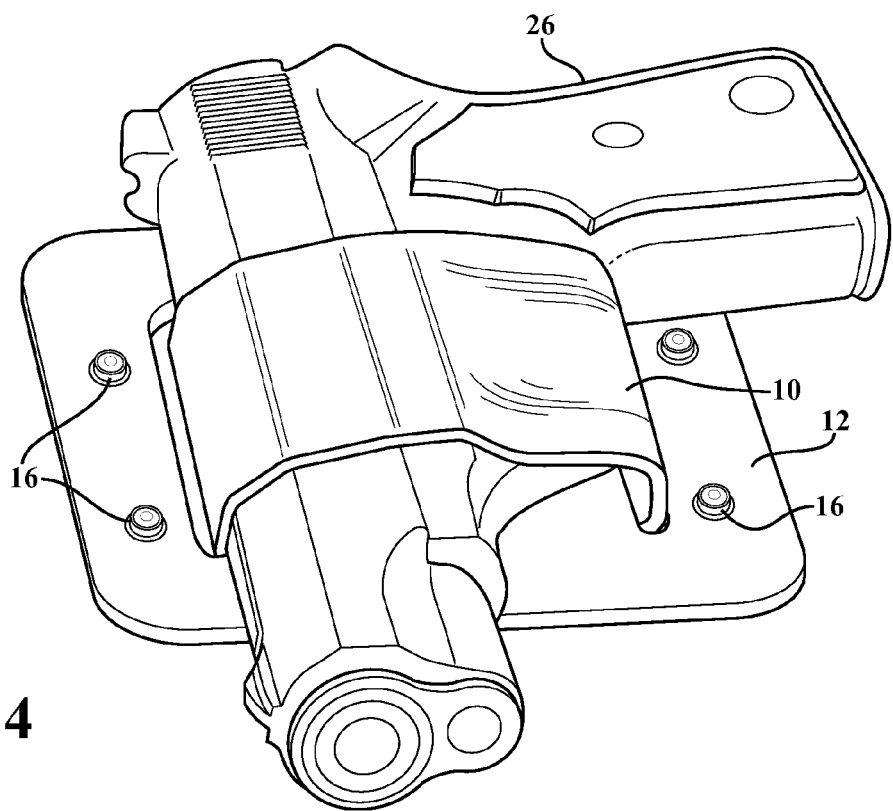
FIG. 4 is a perspective view of the heat shrunken sleeve of the holster with the handgun 26 inserted therein, ready for assembly into the finished article shown in FIG. 2.

As shown in FIG. 4, the first step is to slide the sleeve 10 onto the tab 14 of the carrier 12. The preferred next step 30 is to wrap the handgun in a protective material 42 such as a light fabric stocking. The handgun or pistol 26 with the protective sleeve 42 wrapped there around is then inserted into the polyolefin sleeve 10 to the degree the user has determined desirable in the finished configuration.

The next step is to heat the sleeve 10 and shrink it into conformity with the handgun 26. This step can be carried out using a heat gun 28 of approximately 1,500-1,600 watts, to apply heat to the sleeve with the handgun 26 in place. Under normal circumstances, heat will be applied for 10-20 seconds to achieve the desired degree of shrinking of the sleeve 10 into full conformity and tight fit with the inserted portion of the handgun as shown in FIG. 4. In this Fig., the sock 42 has been removed.

The next step is to cool the sleeve, a step which can be accelerated by inserting the conformed sleeve 10 still around the handgun 26 into a refrigerator or freezer for a short period of time, usually measurable in minutes.

Figure 5:
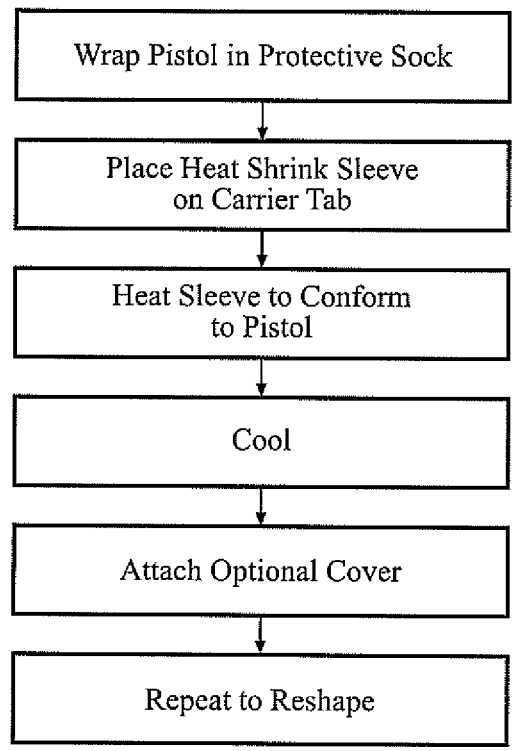
FIG. 5 is a process chart or block diagram.

The next step represented in FIG. 5 is the assembly of the cover 20 to the carrier 14 by way of snaps 22, 16. This step is optional in that the sleeve 10 may be embossed or otherwise textured in which case the user may deem it unnecessary to use a decorative cover 20.

An advantage of the present invention is the available option of using heat to reconfigure the sleeve 10 to a second handgun. This approach would normally be followed if the user were to decide to carry a differently dimensioned or configured handgun rather than the one used to configure and conform the sleeve 10 in the first instance. The user may, for example, may have sold the handgun originally used to conform the sleeve 10 and purchased a new one of slightly different size or shape in which case it would be necessary to re-conform the sleeve 10.

Alternatively, the user may acquire two or more heat shrinkable sleeves 10 and conform each of them to its own individual handgun so that different sleeves of slightly different configuration can be inserted onto the tab 14 on the carrier 12. Both sleeves will be conformed to the tab 14 to fit on the same carrier 12.

Figure 6:
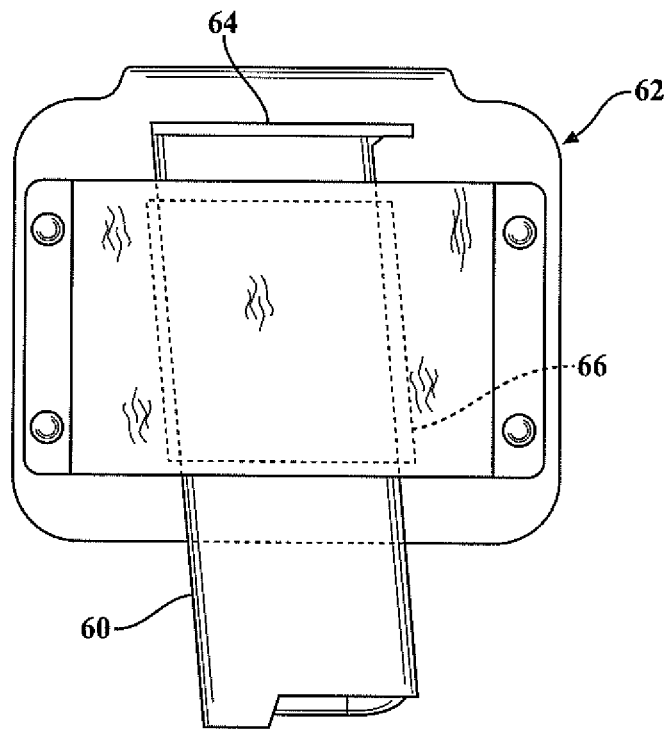
FIG. 6 is a view of the invention as applied to a magazine holster.

It will be understood that the process and principles of the present invention can also be used to manufacture a custom fit carrying device for an article other than a handgun; for example, it may be used to manufacture a holster for an ammunition magazine as shown in FIG. 6. In this case, the holster 62 is adapted to receive the magazine 60 in an inverted vertical position so that the floor plate 64, with or without a finger extension, is exposed at the top of the holster. The heat-conformed sleeve 66 is shown inside a cover in broken lines. It will be understood that the holder 62 has a tab like tab 14 in FIG. 1.

It also will be understood that the sleeve 10 may be selected so as to be long enough to enclose more of the article to be holstered. In all cases, the top end of the sleeve 10 must be open to receive the handgun or magazine or other article to be holstered.

A final aspect of the present invention is the provision of a "do it yourself" kit that the handgun owner/user may use to fabricate his/her own custom holster. The kit comprises the components shown in FIG. 1; i.e., a sleeve or an assortment of sleeves 10, a carrier 12 adapted to receive the sleeve and handgun, and where desired, the decorative cover 20 with a fastening arrangement compatible with the back plate 12. It is to be understood that while snaps have been shown and described as the preferred method of attaching the cover 20 to the back plate 12, other mechanisms such as rivets and screws with or without appropriate washers and nuts may also be used.

Another optional variation of the invention is to use an insert to flare the top of the sleeve slightly during the conformity step thereby making it easier to insert the handgun into the finished holster during use. This can be done in various ways; for example, the sock 42 may be made with a silicone ring around the edge of the open end and lies just inside of the upper edge of the sleeve 10 during the heating step.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A do-it-yourself kit for making a handgun holster comprising:
   a holder which is adapted to attach to a user; and,
   an open-ended sleeve of heat shrinkable material sized to receive at least a portion of the handgun therein and to be reduced in size by heating into substantial conformity with the inserted portion of the handgun while attached to said holder.

2. The do-it-yourself kit as defined in claim 1, wherein the holder includes means for removably attaching the holder to a user's waistband.

3. A holster for a weaponry article chosen from the group consisting of a handgun and an ammunition magazine for a handgun comprising:
- a carrier of non-heat shrinkable material providing a backplate; and
- a sleeve of heat shrinkable polymeric material which has been shrunken by heating into conformity with the article while attached to said carrier.

4. A holster as described in claim 3 wherein the carrier includes a belt hook on a rear side thereof.

5. A holster as described in claim 3 wherein the heat conformed sleeve provides an inter surface in contact with the backplate and an article of conforming outer surface.

6. A method of making a custom fit holster for a handgun, which holster allows the handgun to be inserted for carry purposes, withdrawn for firing, and re-holstered for carrying as desired, wherein the method comprises the steps of:
- a. mounting an open-ended sleeve of heat shrinkable material on a carrier of non-heat shrinkable material;
- b. inserting at least portions of the barrel and trigger guard of the handgun into the mounted sleeve; and, thereafter;
- c. heating the sleeve with the handgun so inserted to shrink the sleeve into conformity with the inserted portion of the handgun.

7. The method defined in claim 6 wherein the heat shrinkable sleeve is made of a polyolefin material with a thickness of approximately 0.04 to 0.07 inches and a heat-shrinkable ratio of about 3:1.

8. The method described in claim 6 including the further step of attaching a decorative/protective cover to the carrier so as to extend over and cover the size-reduced sleeve.

* * * * *